July 14, 1925.
I. D. LENGEL
1,546,291
VALVE FOR AIR BRAKE MECHANISM
Filed Sept. 20, 1924
2 Sheets-Sheet 1
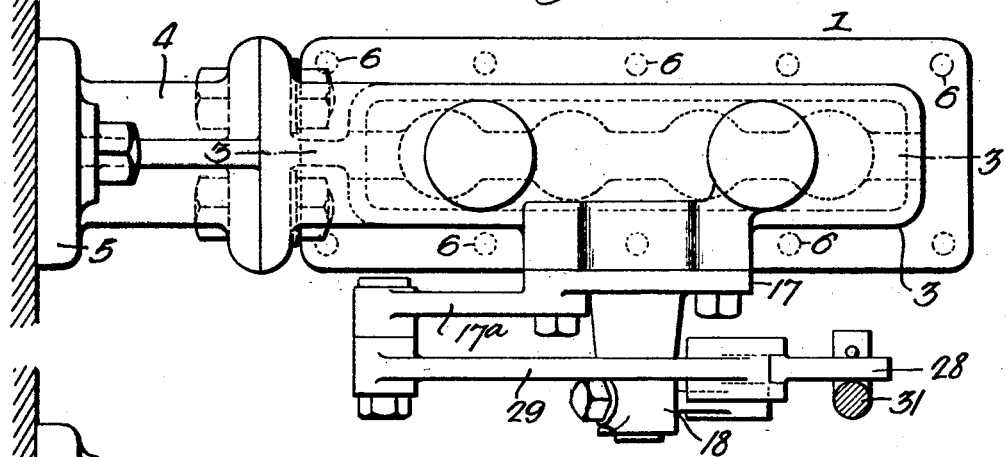
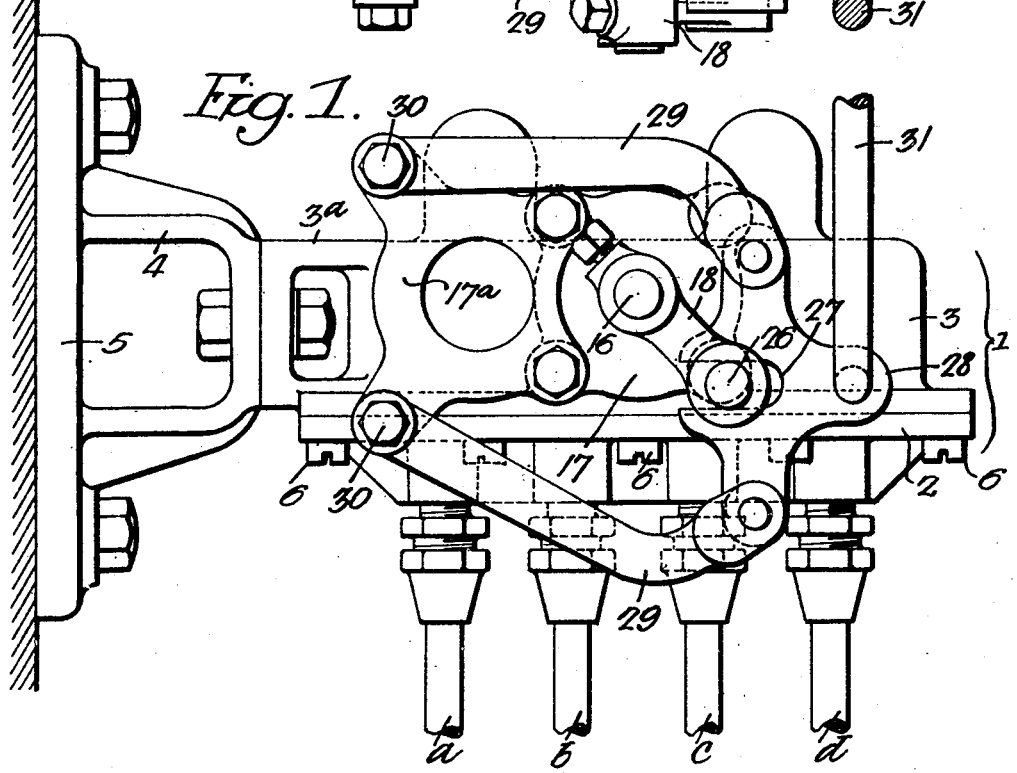
Inventor:
Irvin D. Lengel.
by his Attorneys.

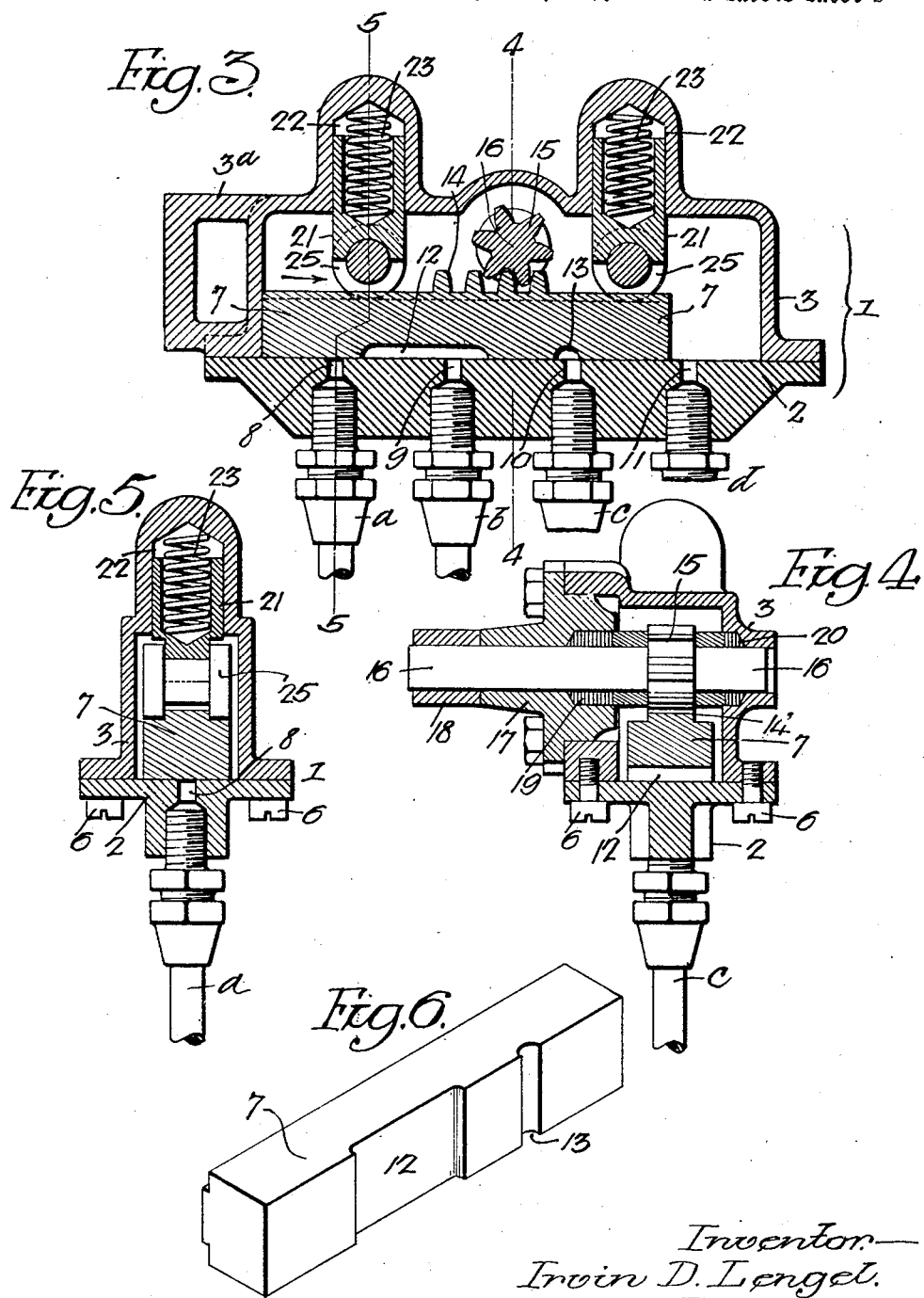

Patented July 14, 1925.

1,546,291

UNITED STATES PATENT OFFICE.

IRVIN D. LENGEL, OF READING, PENNSYLVANIA, ASSIGNOR TO LENGEL COMPANY, OF WILMINGTON, DELAWARE, A CORPORATION OF DELAWARE.

VALVE FOR AIR-BRAKE MECHANISM.

Application filed September 20, 1924. Serial No. 738,809.

*To all whom it may concern:*

Be it known that I, IRVIN D. LENGEL, a citizen of the United States, residing in Reading, Berks County, Pennsylvania, have invented certain Improvements in Valves for Air-Brake Mechanism, of which the following is a specification.

The object of my invention is to construct a valve for controlling the flow of air under pressure to the brake mechanism of an automobile, or other power driven vehicle.

The invention is especially adapted for use in connection with the brake mechanism of omnibuses and heavy trucks where it is desired to apply the pressure progressively.

In the accompanying drawings:

Fig. 1 is a side view of a valve structure illustrating my invention;

Fig. 2 is a plan view;

Fig. 3 is a longitudinal sectional view on the line 3—3, Fig. 2;

Fig. 4 is a sectional view on the line 4—4, Fig. 3;

Fig. 5 is a sectional view on the line 5—5, Fig. 3; and

Fig. 6 is a detached perspective view of the slide valve.

Referring to the drawings, 1 is the casing of the valve, which is made in two parts. 2 is the base plate and 3 is the body portion, which encloses the slide valve and its operating mechanism. The body portion has an extension 3$^a$, which is attached to a bracket 4 by bolts, or other fastenings, as shown clearly in Fig. 1. The bracket 4 has a plate 5, which is secured to the frame of the vehicle. The base plate 2 is secured to the body portion 3 by bolts 6 and the upper surface of the base plate is finished to furnish a slide-way for the slide valve 7, which is located in the body portion.

In the base plate are four ports 8, 9, 10 and 11, which communicate with pipes $a$, $b$, $c$ and $d$, respectively. The slide valve has an elongated passage 12 and a narrow passage 13. When the valve is in the position shown in Fig. 3, the intake port 8 is closed and the passage 12 in the valve is over the port 9, while the passage 13 is over the port 10. The exhaust port 11 is open to the interior of the body portion of the valve structure so that the two ports 9 and 10 communicate with the exhaust passage.

When the valve is moved in the direction of its arrow, the exhaust port 11 is closed and the inlet port 8 is open. The port 9 is open to air under pressure, while the port 10 is closed, so that the air flows into that portion of the brake cylinder having the least area. As the valve is moved forward, the port 10 is uncovered, and air, under pressure, is admitted to the large space of the cylinder, applying the full force of air pressure to the piston. On the back of the slide valve 7 is a series of teeth 14, which mesh with a pinion 15 on a transverse spindle 16 that passes through a cap 17, secured to the body portion 3 of the valve casing, Fig. 4. On the end of this valve spindle 16 is an arm 18. At each side of the pinion are packing rings 19 and 20, which prevent the escape of air under pressure between the valve stem and the casing.

In order to retain the valve on its seat at all times, plungers 21 are provided, which are located in chambers 22 in the body portion 3. Back of these chambers are springs 23. The outer ends of the plungers are recessed to receive flanged rollers 25. The flanges of these rollers rest on each side of the valve, as shown clearly in Fig. 5.

In order to operate the valve with the least amount of movement of the foot pedal, the arm 18 is provided with a pin 26, which extends into a slot 27 in a plate 28 that is pivoted to two arms 29, which, in turn, are pivoted to pins 30 that are secured to a bracket 17$^a$, projecting from the cap plate 17. The plate 28 is attached to a rod 31, leading to a foot pedal, or a hand lever, as desired.

By the construction hereinbefore described, a comparatively short movement of the plate 28, shifts the valve to bring the primary cylinder into communication with the inlet port, or the secondary cylinder into communication with the inlet port, or the two cylinder ports in communication with the exhaust.

I claim:

1. The combination in a valve structure for air brake mechanism, of a casing having four ports therein, one port being an inlet port, another an exhaust port and two cylinder ports; a slide valve controlling the passage of fluid under pressure to and from the two cylinder ports; and means for operating the valve.

2. The combination in a valve structure for air brake mechanism, of a casing having four ports therein, one port being an inlet port, another an exhaust port and two cylinder ports; a slide valve controlling the passage of fluid under pressure to and from the two cylinder ports; a yielding pressure means for holding the valve to its seat, said valve having gear teeth; a transverse spindle having a pinion engaging the teeth of the valve; and means for actuating the spindle.

3. The combination in an air valve structure, of a base plate; a body portion to which the base plate is secured; four ports in the base plate, one port communicating with an inlet pipe, the other communicating with the exhaust, and the two intermediate ports communicating with the cylinder to which pressure is applied; a slide valve having a wide passage therein and a narrow passage; and means for actuating the valve so that the first cylinder port will be opened, followed by the second port, and, on the continued movement of the valve, the inlet port will be closed and the exhaust port will communicate with the cylinder ports.

4. The combination in a valve for controlling air under pressure, of a casing consisting of a base plate and a body portion; a slide valve; ports in the base plate, said valve having gear teeth thereon; a transverse spindle mounted in packed bearings; a pinion on the spindle meshing with the teeth of the valve; plungers mounted in chambers in the valve casing; springs back of the plungers; rollers located between the plungers and the valve; and means for actuating the spindle to move the valve to uncover the ports.

5. The combination of a valve casing; a slide valve therein; a spindle having a pinion therein; teeth on the slide valve engaged by the pinion; an arm on the spindle having a pin; a plate provided with a slot into which the pin extends; pivoted arms pivotally connected to the plate; and an actuating rod attached to the plate.

IRVIN D. LENGEL.